United States Patent
Li

(10) Patent No.: US 6,170,279 B1
(45) Date of Patent: Jan. 9, 2001

(54) FISHERMAN REFRIGERATING DEVICE USING ENGINE EXHAUST

(76) Inventor: Ding-yu Li, Wangyuehu 3 Pian 7 Dong 4 Danyua No. 507, Changsha City, Hunan Procince, P.C. 410006 (CN)

( * ) Notice: Under 35 U.S.C. 154(b), the term of this patent shall be extended for 0 days.

(21) Appl. No.: 09/363,293

(22) Filed: Jul. 28, 1999

(51) Int. Cl.[7] .................................................. F25H 27/00
(52) U.S. Cl. ........................................... 62/238.3; 62/480
(58) Field of Search ................................ 62/238.3, 239, 62/240, 480

(56) References Cited

U.S. PATENT DOCUMENTS

| | | | |
|---|---|---|---|
| 3,254,507 | * 6/1966 | Whitlow ................................... | 62/476 |
| 4,341,088 | * 7/1982 | Met et al. ................................ | 62/239 |
| 4,464,907 | * 8/1984 | Macvk et al. ........................... | 62/101 |
| 5,005,371 | * 4/1991 | Yonezawa et al. .................. | 62/238.6 |
| 5,231,849 | * 8/1993 | Rosenblatt ........................... | 62/238.3 |
| 5,359,864 | * 11/1994 | Yamada .................................. | 62/480 |

FOREIGN PATENT DOCUMENTS

| | | | |
|---|---|---|---|
| 515552 | * 1/1931 | (DE) | ...................................... 62/238.3 |
| 5-272844A | * 10/1993 | (JP) | ...................................... 62/238.3 |

* cited by examiner

*Primary Examiner*—William Doerrler
*Assistant Examiner*—Melvin Jones
(74) *Attorney, Agent, or Firm*—Pro-Techtor International Services

(57) ABSTRACT

The invention is a fisherman refrigerating device using engine exhaust, which comprises a refrigerating tub, a storage bottle of the coolant liquid ammonia, a condenser and two generators whose guiding pipe is connected to the inlet of the condenser via a valve. The outlet connects to the coolant inlet of the storage bottle, the coolant outlet of the storage bottle then connects to the inlet of the vaporizer through a flux control valve. The vaporizer outlet connects to the guiding pipe of the generators by a valve, the outer case of the generator has an engine exhaust pipe and an inner pipe on it. An inner tube with apertures and calcium chloride are between those pipes, and the inner tube connects to the guiding pipe. A sprinkling tube sits above the inner pipe and the outer case has a water pipe connector.

4 Claims, 4 Drawing Sheets

FISHERMAN REFRIGERATING DEVICE USING ENGINE EXHAUST

BACKGROUND OF THE INVENTION

1. Field of the Invention

The invention relates to an adsorptive refrigerating device and, in particular, to an adsorptive refrigerating device utilizing the heat from the engine exhaust.

2. Description of the Prior Art

In current technology, fishermen need to carry a large amount of ice to keep caught fishes fresh for a long time when they go fishing in the sea. Since it takes very much electrical energy to make ice and keep ice in a low temperature environment, the ice is therefore expensive and very often short of supply. This can not guarantee or meet the need of proper fish storage on the boat. On the other hand, in spite of the fact that traditional adsorptive refrigerating devices have been proposed and are technically feasible, yet the refrigerating efficiency is low and the temperature fluctuates a lot. Thus there is no practical products on the market.

SUMMARY OF THE INVENTION

The present invention provides a fisherman refrigerating device using engine exhaust which takes the exhaust heat from a ship engine as the heat source to realize the adsorptive cyclical refrigeration and to produce ice for fish storage on the ship. This has the features of saving energy and good refrigerating effect without costing extra fuel and lowering the engine power.

The fisherman refrigerating device using engine exhaust according to the invention comprises a refrigerating tub which contains a storage bottle of coolant liquid ammonia and a condenser. The refrigerating tub has a heat-insulating box-type body and a removable lid. The body has a vaporizer, which comprises several closed tubes connecting in series with one end as the inlet and the other end as the outlet. The surface of each closed tube has heat conducting wings. The storage bottle comprises a heat-insulating bottle, a coolant inlet and a coolant outlet. The condenser comprises a water reservoir and a spiral tube in the water layer, wherein the water reservoir consists of an upper water outlet and a lower water inlet, and the spiral tube has an inlet and an outlet. The invention comprises two generators and the guiding pipes of which are connected to the spiral tube inlet of the condenser via corresponding stop valves, while the spiral tube outlet is connected to the inlet of the storage bottle under the condenser. The storage bottle outlet is connected with the inlet of the vaporizer via a flux control valve. The vaporizer outlet is connected to the guiding pipes of the two generators by two stop valves, respectively. The structure of the generator is that an engine exhaust pipe runs through the outer case and an inner pipe sits in the engine exhaust pipe. The chamber between the engine exhaust pipe and the inner pipe is filled with several inner tubes and calcium chloride as the adsorbent. The wall of the inner tube has several apertures, and one end of the inner tube is closed while the other open. The open ends of the inner tubes are connected to the guiding pipe from the chamber. The upper part of the outer case has a water inlet connector connecting to the porous sprinkling tube above the inner pipe, whereas the lower part of the outer case has a water outlet connector.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
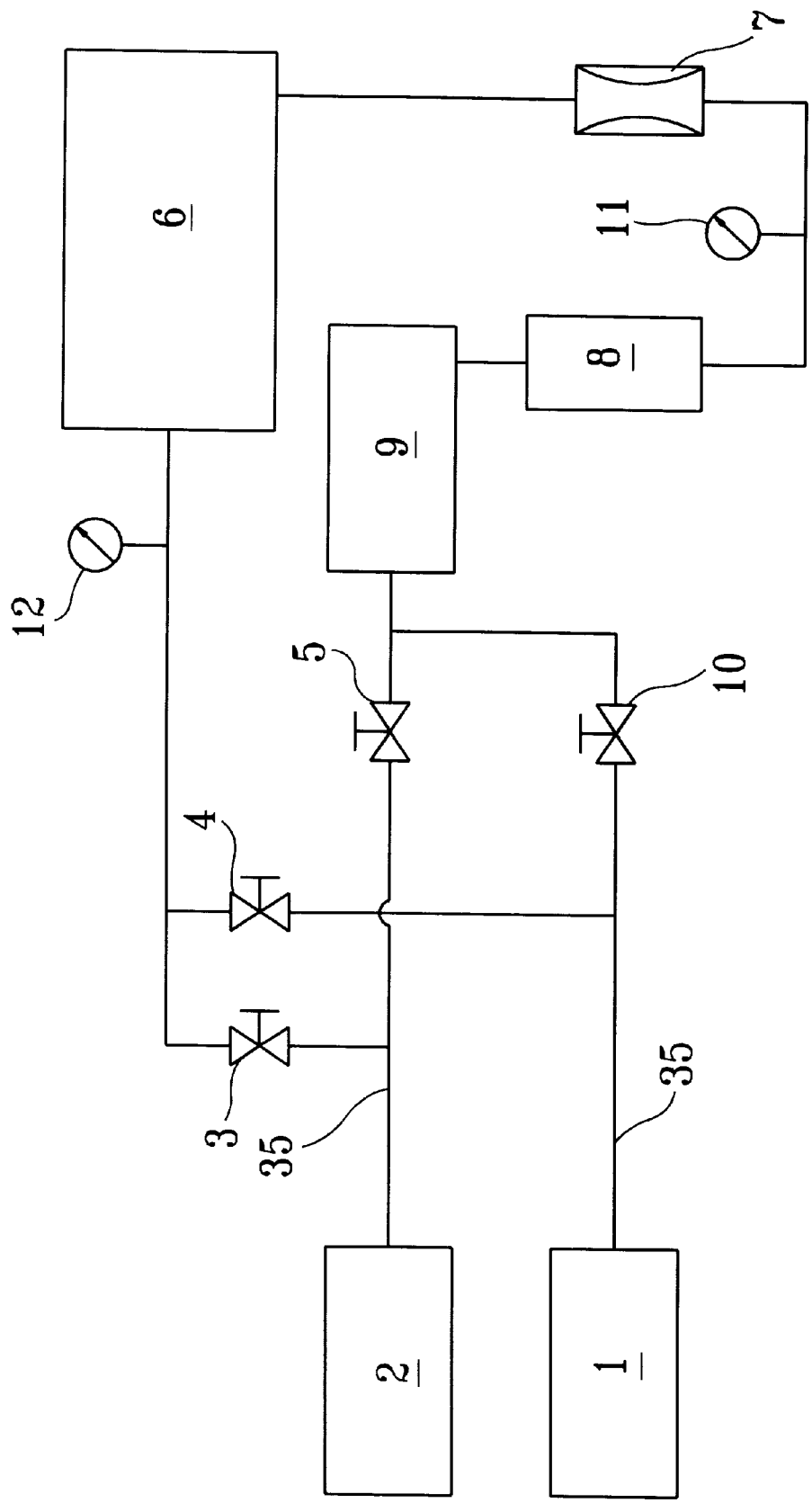
FIG. 1 is the whole structure of the present invention.

Please refer to FIG. 1. The fisherman refrigerating device using engine exhaust according to this invention comprises a refrigerating tub 6 which contains a storage bottle 8 of coolant liquid ammonia and a condenser 9.

Figure 2:
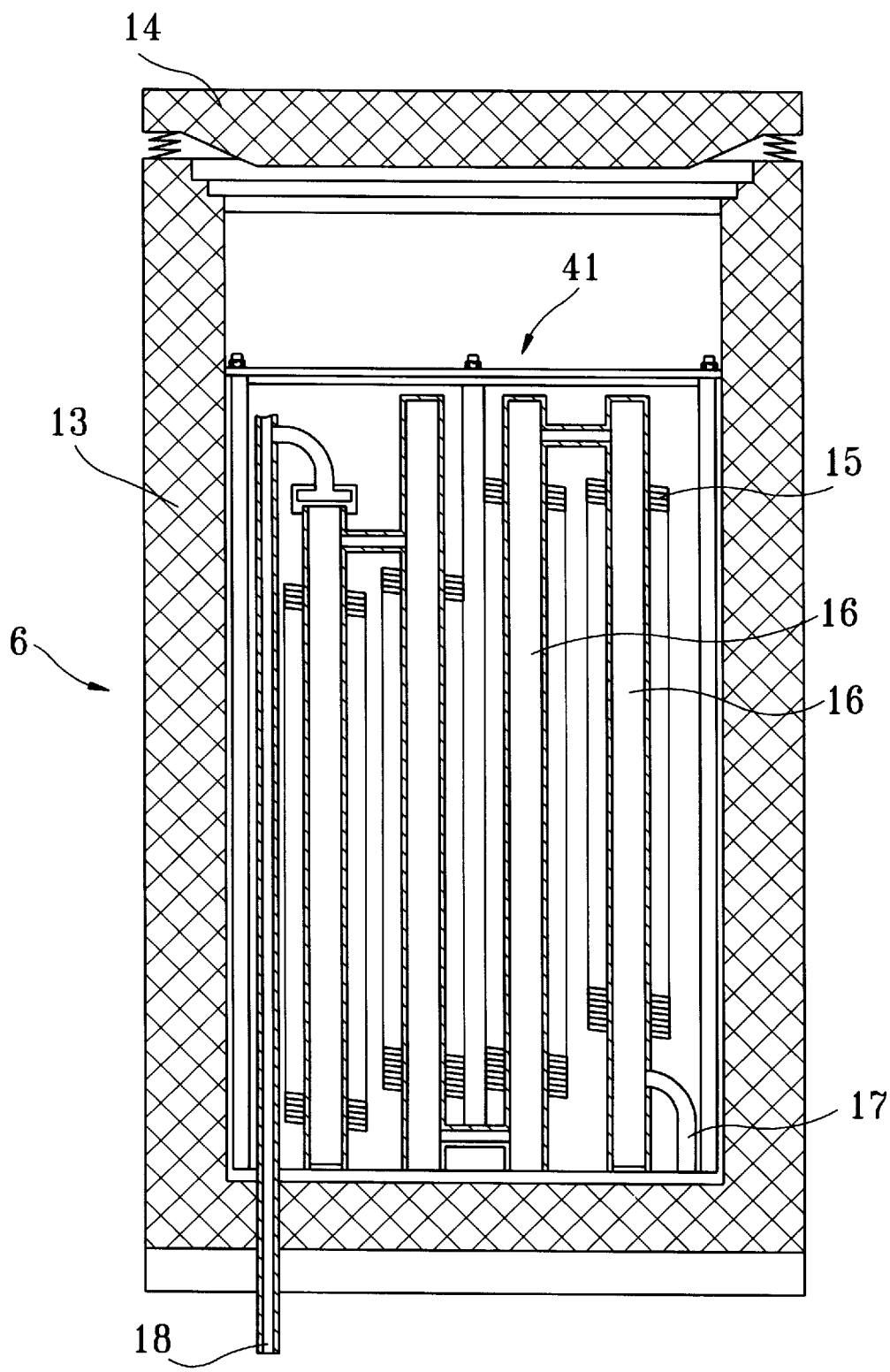
FIG. 2 is a cross-sectional view of the refrigerating tub according to the invention.

Please refer to FIG. 2. The refrigerating tub 6 has a heat-insulating box-type body 13 and a removable lid 14. The body 13 has a vaporizer 41, which comprises several closed tubes 16 connecting in series with one end as the inlet 18 and the other end as the outlet 17. The surface of each closed tube 16 has heat conducting wings 15.

Figure 3:
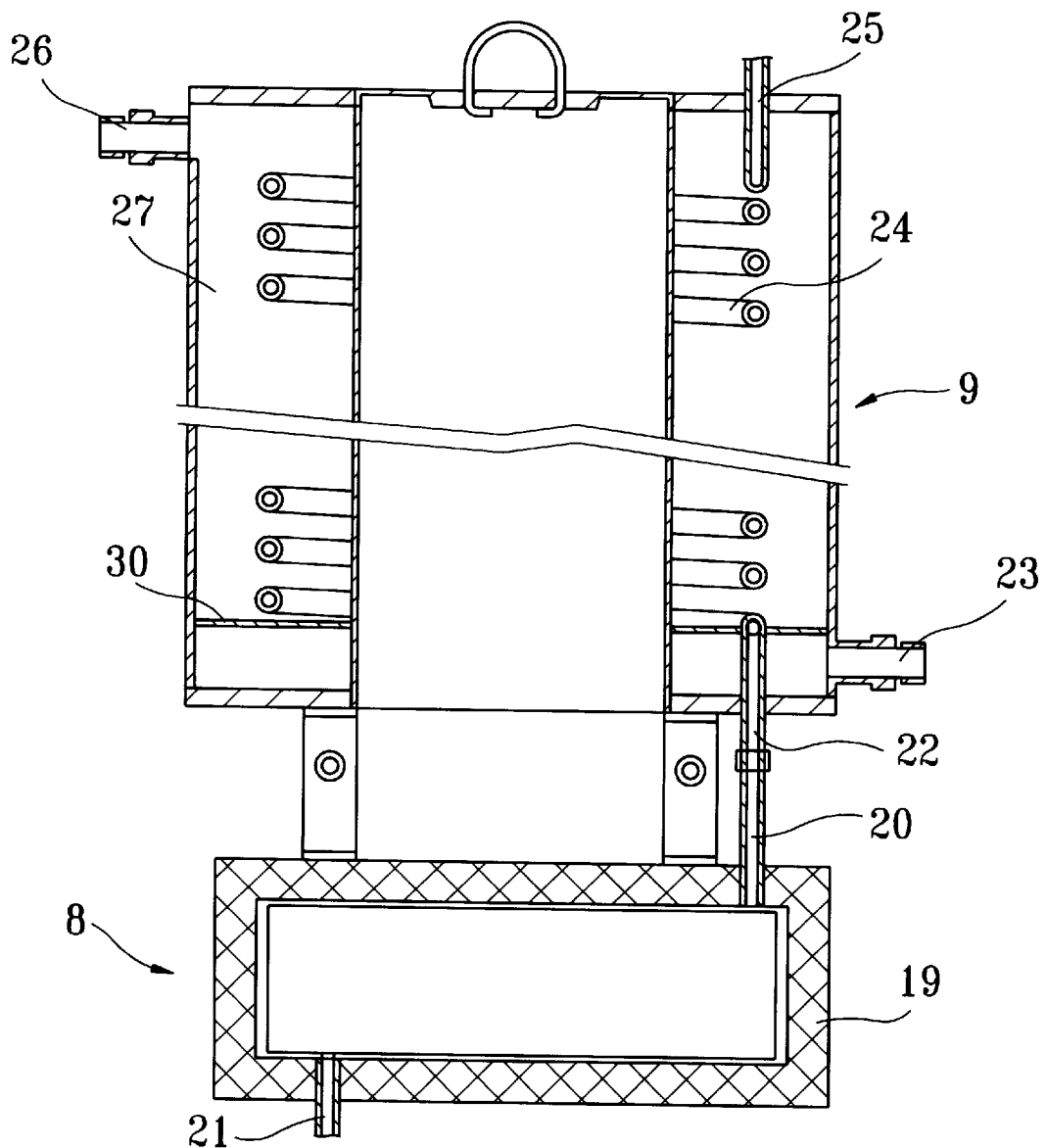
FIG. 3 is a vertical cross-sectional view of the condenser and the storage bottle according to the invention.

Please refer to FIG. 3. The storage bottle 8 comprises a heat-insulating bottle 19, an coolant inlet 20 and an coolant outlet 21. The condenser 9 comprises a water reservoir 27 and a spiral tube 24 in the water layer, wherein the water reservoir 27 consists of an upper water outlet 26 and an lower water inlet 23, and the spiral tube 24 has an inlet 25 and an outlet 22.

Figures 4, 5:
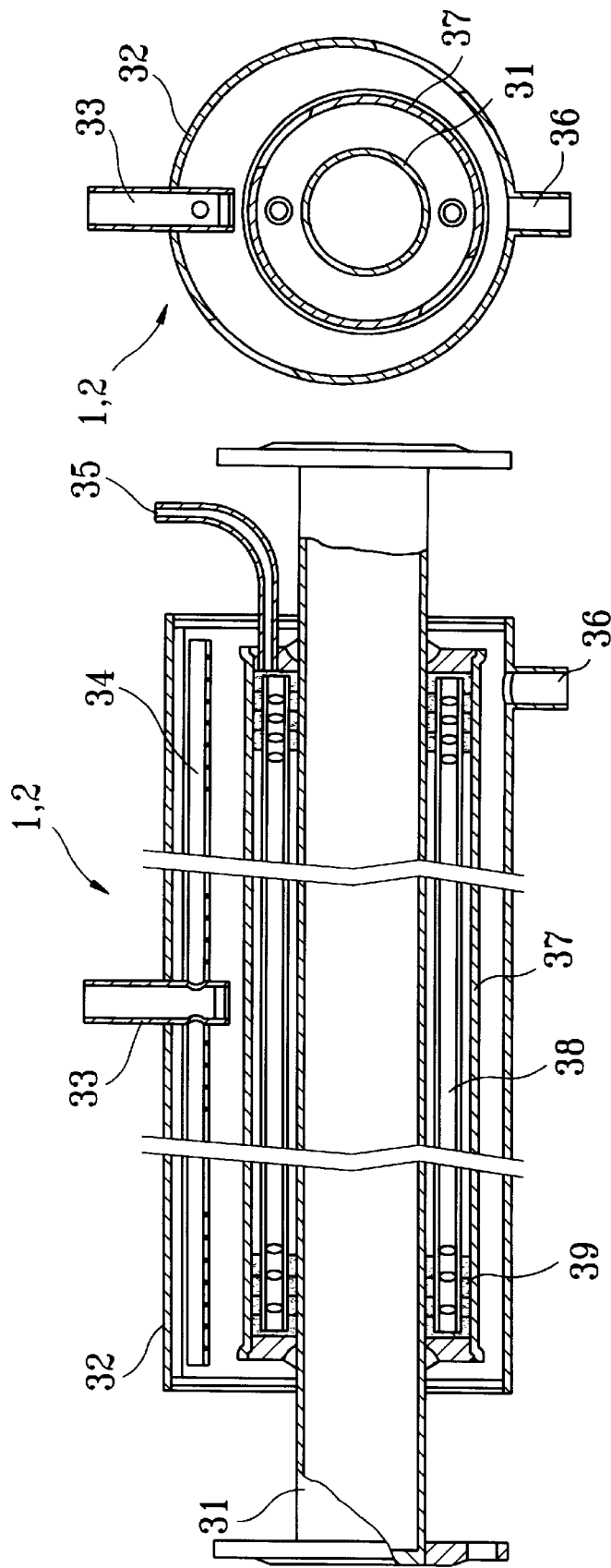
FIG. 4 is a cross section of the generator according to the invention.
FIG. 5 is a radial cross section of the element in FIG. 4.

Please refer to FIG. 1 and 4. The invention comprises two generators 1, 2 and the guiding pipe 35 of which is connected to the spiral tube inlet 25 of the condenser 9 via a first stop valve 5 and a second stop valve 10, respectively, while the spiral tube outlet 22 is connected to the coolant inlet 20 of the storage bottle 8 under the condenser 9. The storage bottle coolant outlet 21 is connected with the inlet 18 of the vaporizer 41 via a flux control valve 7. The vaporizer outlet 17 is connected to the guiding pipe 35 of the two generators 2,1 by a third stop valve 3 and a fourth stop valve 4, respectively.

Please refer to FIG. 4 and 5. The structure of the generators 1,2 is that an engine exhaust pipe 31 runs through the outer case 32 and an inner pipe 37 sits in the engine exhaust pipe 31. The chamber between the engine exhaust pipe 31 and the inner pipe 37 is filled with several inner tubes 38 and calcium chloride as the adsorbent 39. The wall of the inner tube 38 has several apertures, and one end of the inner tube 38 is closed while the other open. The open ends of the inner tubes 38 are connected to the guiding pipe 35 from the chamber. The upper part of the outer case 32 has a water inlet connector 33 connecting to the porous sprinkling tube 34 above the inner pipe 37, whereas the lower part of the outer case 32 has a water outlet connector 36.

For the convenience of observing the operation, a first pressure gauge 12 can be placed on the common end of the third and fourth valves 3,4, and a second pressure gauge 11 can be placed between the flux control valve 7 and the storage bottle 8. Please refer to FIG. 3. To enhance the refrigerating effect, the water flow is designed to flow in the opposite direction of the refrigerating fluid flow in the spiral tube 24. To make a thorough contact between the cooling water and the spiral tube 24, a layer of water distributing porous plate 30 may be placed under the water reservoir 27 so that the water flows evenly above the plate 30 to effect cooling. Since the adsorptive refrigeration cycle of one generator according to the invention is around half an hour, the stop valves 3,4,5,10 can be manual valves switched by hand according to schedule, or can be automatic valves of the prior art, such as the electric valves and electric air valves. The heat-insulating structure of the refrigerating tub 6 can be that of the traditional refrigerator or the large freezer; for example, filling froth plastic between box walls. In application, the two generators 1, 2 in FIG. 4 can be connected in parallel and both of them are then connected to the exhaust pipe, or the two generators 1,2 can be connected in series and then connected to the exhaust pipe, or the two generators 1,2 can be made into a semicircle structure and installed onto the exhaust pipe. One of the generators 1,2 can be composed of a plural set of generator units or just one generator unit (one inner tube and the corresponding adsorbent compose one unit).

Please refer to FIG. 1. The operating principle of the instant invention is to connect the water inlet of the condenser 9 and the water inlet connector 33 of the generators 1,2 to the cold water source. The first refrigerating process is described as the following. First, open the first stop valve 5 and the fourth stop valve 4 and shut off the second stop valve 10 and the third stop valve 3, so that the engine exhaust can pass through the generator 2 to open the cooling valve of the generator 1 (the cooling valve of the generator 2 closes at this moment). The coolant ammonia adsorbed to the calcium chloride in the generator 2 is released by the heat coming from the engine exhaust. The ammonia gas passes through the little apertures on the tube into the inner tube 38, and then enters the condenser 9 via the guiding pipe 35 and the first stop valve 5. After been cooling down, the ammonia flows into the storage bottle 8. This releasing process also produces a compression effect on the gas coolant. At the same time, the calcium chloride in the generator 1 undergoes the adsorption of coolant in the vaporizer 41 within the refrigerating tub 6 via the fourth stop valve 4 due to the temperature-lowering effect from the cooling water. This adsorption process allows the occurrence of a phase transition on the coolant in the vaporizer 41 to absorb the heat in the environment and realize the refrigerating function. The storage bottle 8 replenishes the vaporizer with coolant, and the flux control valve 7 controls the flux of the coolant. This adsorption process also generates vacuum sucking to accelerate the speed of the coolant phase transition and enhance the refrigerating effect.

When the above mentioned first refrigerating process finishes (the generator 2 releases all the coolant and the other generator 1 completes adsorption), it starts the second refrigerating process. The engine exhaust heats up the generator 1 while cools down the generator 2. The second stop valve 10 and the third valve 3 open, whereas the fourth stop valve and the first valve 5 closes. Then the system goes on the same refrigerating process as the first refrigerating process. These two refrigerating processes perform consecutively and realize the continuous cooling effect to the refrigerating tub 6. The refrigerating cycle, namely, the consecutive Carnot cycle, of the compression refrigeration system is thus fulfilled. Therefore, the invention completes the adsorptive refrigerating process by using the ship engine exhaust heat as the heat source.

From the above, we know that this invention provides a fisherman refrigerating device using the engine exhaust, which utilizes the exhaust heat energy to effectively and reliably make the ice for keeping the freshness of fishes obtained in overseas fishing under the premise of not increasing the fuel consumption and efficiency. This greatly saves the energy and lowers the fishing cost.

One embodiment of the present invention according to the figures and the above mentioned structure can be as follows: assemble the relevant elements into an integrated product placed within a box (generators are attached separately); the inner and outer radii of the water reservoir 27 of the condenser 9 are 160 mm and 320 mm, respectively; the radius and tube radius of the spiral tube 24 are 120 mm and 10 mm, respectively; the height of the condenser 9 is 300 mm; the inner and outer radii and length of the storage bottle 8 are 100 mm, 120 mm, and 300 mm, respectively; the valves are manually operated; the total length of the generator 1 or 2 is 900 mm; the diameters of the outer case 32, inner pipe 37 and the engine pipe 31 are 165 mm, 125 mm, and 68 mm; the adsorbent is calcium chloride and the coolant is ammonia. If the engine exhaust heat is properly collected, the temperature of the refrigerating tub 6 can be lowered to less than −5° C. continuously to meet the need for making ice.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A fisherman refrigerating device using engine exhaust, which comprises:

a refrigerating tub equipped with a vaporizer, wherein said vaporizer has an inlet and an outlet;

a storage bottle of the coolant liquid ammonia, which has a coolant inlet and a coolant outlet, wherein said coolant outlet of said storage bottle is connected to said inlet of said vaporizer via a flux control valve;

a condenser which comprises a water reservoir and a spiral tube placed within, wherein said water reservoir has an upper water outlet and a lower water inlet, said spiral tube has an inlet and outlet, so that said outlet of said spiral tube is connected to said coolant inlet of said storage bottle; and two generators filled with adsorbent calcium chloride for absorbing the heat energy from the engine exhaust, wherein said two generators are connected to said inlet of said spiral tube of said condenser via a guiding pipe, a first stop valve and a second stop valve, respectively, said outlet of said vaporizer is connected to said guiding pipe of said two generators via a third stop valve and a fourth stop valve, respectively;

wherein said stop valves are opened and closed consecutively so that said calcium chloride adsorbed with said coolant ammonia in one of said two generators releases said coolant by the heat from said engine exhaust, said ammonia enters said condenser via said guiding pipe to get condensed and then flows into said storage bottle for storage; while at the same time the other of said two generators is cooled down so that said calcium chloride in it starts the adsorption process which makes said coolant in said vaporizer undergo a phase transition and absorb the heat from the environment to effect cooling; and said storage bottle replenishes said vaporizer with said coolant.

2. A fisherman refrigerating device using engine exhaust as in claim 1, wherein said refrigerating tub comprises a heat-insulating box-type body and a removable lid, and said vaporizer is installed within said heat-insulating box-type body.

3. A fisherman refrigerating device using engine exhaust as in claim 2, wherein said vaporizer is composed of a plurality of closed tubes connected in series, and the outer surface of each of said plurality of tubes is equipped with a plurality of heat conducting wings.

4. A fisherman refrigerating device using engine exhaust as in claim 1, wherein the outer case of one of said generators has a engine exhaust pipe running through and an inner pipe is installed on said engine exhaust pipe, and the chamber between said engine exhaust pipe and said inner pipe is placed with at least one inner tube and at least one adsorbent calcium chloride; said inner tube has a plurality of apertures, one closed end, and one open end, and said open end is connected to said guiding pipe from said chamber; the upper part of said outer case has a water inlet connector connecting to a porous sprinkling tube above said inner pipe; and the lower part of said outer case has a water outlet connector.

\* \* \* \* \*